INVENTORS
ANDREW A. FRANK
RONALD O. ROGERS
BY
ATTORNEY

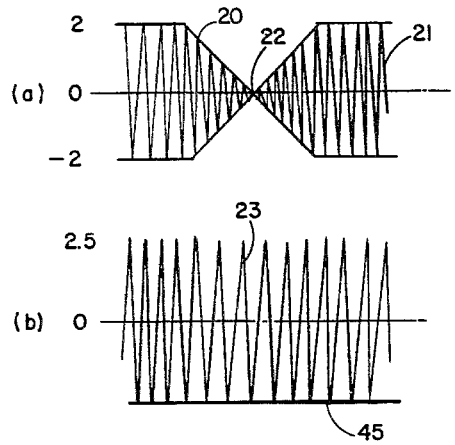
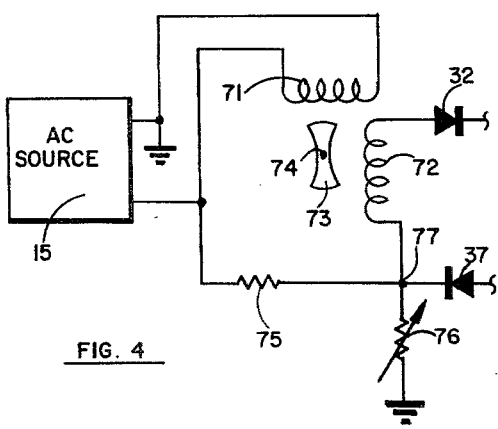
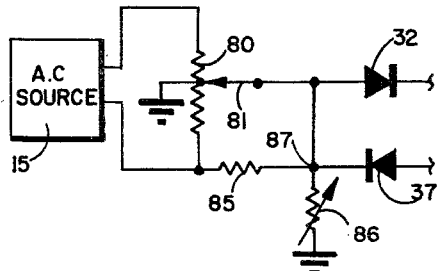
FIG. 2
FIG. 4
FIG. 5
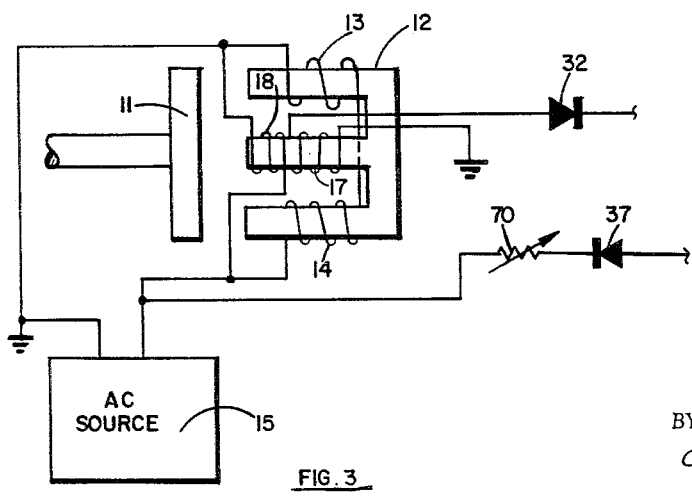
FIG. 3
INVENTORS
ANDREW A. FRANK
RONALD O. ROGERS
BY
ATTORNEY INVENTORS
ANDREW A. FRANK
RONALD O. ROGERS
BY
*Allen Rothenberg*
ATTORNEY

United States Patent Office 3,229,210
Patented Jan. 11, 1966

3,229,210
PHASE SENSITIVE DEMODULATOR OPERATING ON BI-POLAR AMPLITUDE MODULATED SIGNALS
Andrew A. Frank, Long Beach, and Ronald O. Rogers, La Mirada, Calif., assignors to North American Aviation, Inc.
Filed Dec. 28, 1961, Ser. No. 162,660
7 Claims. (Cl. 328—1)

This invention concerns demodulators and particularly relates to a phase sensitive demodulator specifically adapted for handling alternating current signals having a bi-polar amplitude modulation.

The invention described herein is of general utility and may find application in many situations where a simplified demodulator circuit is needed to extract information carried by the envelope of an amplitude modulated signal. Nevertheless, for a complete and full understanding of the invention, it will be described as a part of a feedback control system of a type in which the invention has been initially employed.

In servo-control systems such as those embodied in aircraft stability augmentation systems, for example, there is provided an A.-C. sensing element which senses a desired aircraft condition such as an orientation angle, a rate of turn, acceleration, or the like. This signal is to be fed to a suitable aircraft control mechanism to effect control of the aircraft in accordance with the sensed condition. As will be readily understood by those skilled in the servo control art, proper signal shaping is required so as to provide a suitable lead or lag which may be determined to be necessary for the particular control system under consideration. Proper shaping of an A.-C. signal has been found to require costly and complex circuitry which can be greatly minimized by operating upon a D.-C. signal. Consequently, it is common practice to demodulate the A.-C. pickoff output for ease of shaping and then remodulate it for use by the control mechanism. It may be noted that D.-C. pickoffs or sensing instruments generally are not employed in view of the drift-induced difficulty of amplification of D.-C. signals. Further, the reliability and resolution of D.-C. pickoffs are in general inferior to that of A.-C. pickoffs. Thus it will be seen that the servo control system will include an A.-C. pickoff and a signal shaping network which is responsive thereto. Interposed between the pickoff and the signal shaping network is a phase sensitive demodulator. The shaping network will generally be followed by a modulator and an A.-C. amplifier which feeds into the control mechanism.

The phase sensitive demodulator required in a control system such as that described above is a fairly complex circuit. Typical of the circuits presently employed in this application is that illustrated in Patent No. 2,562,912 to Hawley for Phase Sensitive Demodulator. A major reason for the complexity of this circuit is the difficulty of handling the sensed signal when the sensing instrument is at or about its null position. Significant disadvantages of most A.-C. pickoffs are due to the fact when its output changes phase, going through zero, a relatively high quadrature null voltage exists. This null is a major source of nonlinearity. Further, the difficulties of handling the quadrature voltage of the pickoff in null position necessitate a precision instrument and, therefore, place rigid restrictions upon the tolerances and manufacturing precision required of the sensing instrument. Accordingly, an object of this invention is to provide a demodulator which is highly tolerant of relatively poor null position voltages and quadrature components of an A.-C. sensing instrument.

In carrying out the principles of this invention, in accordance with a preferred embodiment thereof, the tolerances on the null position voltage of the sensing instrument are greatly eased to minimize disadvantages of quadrature and in-phase voltage components existing at the instrument null. This result is achieved largely by employing circuitry which cause the output signal of the pickoff to remain at one polarity at all times. By adding to the pickoff output an A.-C. bias having a magnitude at least equal to a predetermined full-scale magnitude of the pickoff output, the biased output will never go through zero whereby the problems existing at null are substantially avoided. Both the combined pickoff and bias signal and the bias signal itself are half-wave demodulated by simple structure actually comprising nothing more than a single diode for each signal in an exemplary embodiment. Both demodulated signals are filtered and then the pickoff signal is suitably shaped. The demodulated bias signal is differentially combined with the output of the shaping network to remove the D.-C. bias whereby the shaped signal may be remodulated and fed via an A.-C. amplifier to the control mechanism. For optimum operation the bias signal is suitably phase shifted.

With an arrangement such as that described herein, the sensing instrument whether it be displacement gyro, rate gyro, accelerometer, velocity meter, or the like, no longer requires a high precision null whereby it will be seen that the use of this demodulator affords a substantial saving in instrumentation costs and complexity. Further, as compared with a demodulator such as that shown in the above-mentioned patent to Hawley, the demodulator of the present invention requires fewer components whereby the circuit is cheaper and of substantially less complexity.

Thus, an object of the invention is the provision of a simplified phase sensitive demodulator employing fewer components.

Still another object of the invention is to provide an improved servo control circuit.

Another object of the invention is to provide a servo control circuit employing a simplified demodulator together with a sensing device having a null voltage which is of substantially negligible effect upon the operation of the circuit.

A further object of the invention is to eliminate the undesirable sensitivity of a phase sensitive demodulator to a poor null signal.

These and other objects of the invention will become apparent from the following description taken in connection with the accompanying drawings, in which:

FIG. 1 comprises a circuit diagram of a preferred embodiment of the invention;

FIGS. 2a, b, c illustrates certain waveforms connected with the operation of the circuit of FIG. 1;

FIG. 3 shows the pickoff of the sensing instrument modified to incorporate therein an offset or bias according to the principles of this invention;

FIG. 4 shows a modification of the circuit of FIG. 1;

FIG. 5 illustrates an application of the invention to a resistive pickoff; and

Figure 6:
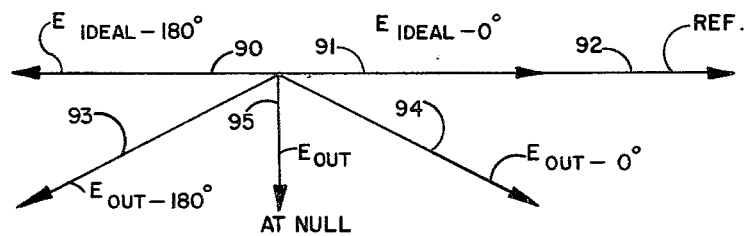
Figure 7:
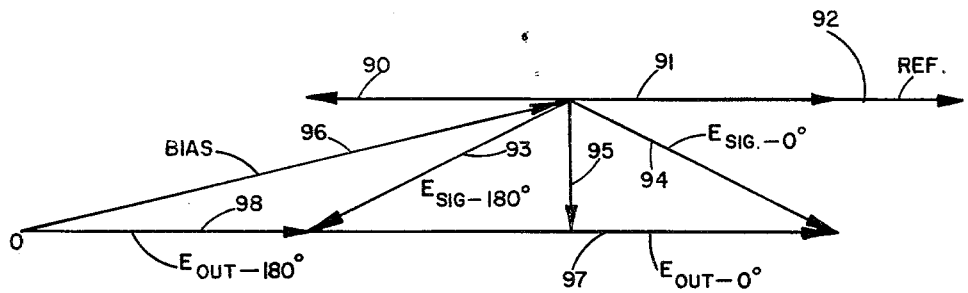

FIGS. 6 and 7 comprise vector diagrams explanatory of certain aspects of the invention.

In the drawings like numerals refer to like parts.

Figure 1:
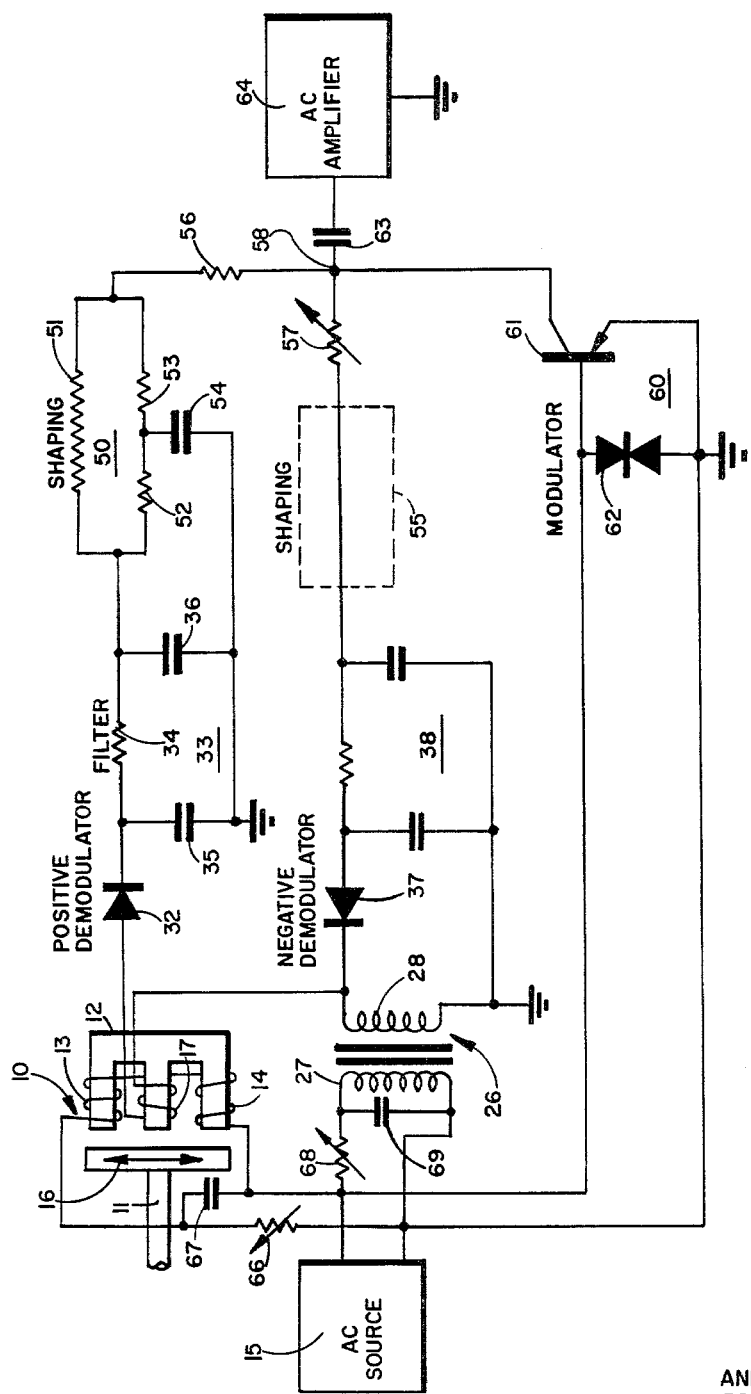

Designated at 10 in FIG. 1 is an E-type pickoff commonly employed in gyros and acceleration sensitive instruments. Specifically the pickoff includes relatively moveable parts 11 and 12 together with circuitry and coils arranged to provide an output signal indicative of the magnitude and sense of relative motion of the two pickoff parts. The pickoff parts are physically incorporated into the sensing instrument as is well known to those skilled in the art so that the relative motion between the parts is indicative of the sensed condition such as acceleration, velocity, angle, rate of turn, or any physical quantity capable of producing said relative motion (pressure, temperature, etc.). In a typical arrangement part 12 is fixed while part 11 is mounted for pivotal motion about an axis normal to the plane of the drawing in the direction of arrow 16.

Pickoff part 12 has a pair of outer legs upon which are wound exciting coils 13 and 14 connected in series opposition. These exciting coils are energized from a suitable source 15 of A.-C. signal having a frequency such as, for example, 400 cycles per second where the sensed condition is expected to have a frequency of 10 percent or less of the exciting frequency. The exciting coils are wound so that at any given instant the flux components caused by each are mutually opposed to cancel out in the center leg of the pickoff part 12 when the two parts 11 and 12, are in some predetermined relative position, namely, the null position of the instrument. Upon occurrence of a relative motion between the two pickoff parts in the direction of arrow 16 the magnetic coupling between the pickoff part 11 and the two outer legs of pickoff part 12 is relatively varied to effect opposite sense changes in the flux components due to each of the exciting coils so that one flux component will increase and the other will decrease. Accordingly, a net flux component will exist in the center leg of the pickoff where it may be sensed by a sensing winding 17 thereon.

By specific physical arrangement of the various parts of the instrument and pickoff and by suitable proportioning of the electrical components, the sensing instrument is provided with a null position desirably characterized by a zero net flux in the center leg of the pickoff part 12 to thereby produce a substantially zero output signal in the sensing coil 17. Upon relative motion of the pickoff parts in the direction of arrow 16, there is developed in the center leg of part 12 and in the sensing coil 17 an output signal having a magnitude proportional (within the linear range of the instrument) to the magnitude of the relative motion of the pickoff parts and having a phase with respect to the phase of source 15 determined by the direction of the relative motion.

As illustrated in FIG. 2a, considering an exemplary relative motion of the pickoff parts to be as depicted by the envelope 20 of the illustrated curve, it will be seen that for this exemplary relative motion the output of the sensing winding (in the absence of application of the structure and principles of the present invention) will appear as the amplitude modulated signal having an envelope 20 modulated upon the excitation or carrier signal indicated at 21. It will be noted that the phase of the carrier with respect to the phase of the source changes by 180 degrees as the modulation envelope goes through zero at point 22 of FIG. 2a. While the drawing depicts an actual zero magnitude of the amplitude modulated pickoff signal occurring at point 22, in actual fact, despite the utmost care and precision achieved in the manufacture of the sensing instrument, the output signal at this null position 22 will always have some magnitude and, in addition, will have a component which is in phase quadrature with respect to the A.-C. source 15. The elimination of difficulties encountered in and by the demodulation, shaping, and amplification of these in-phase and quadrature components is a major feature of the present invention.

Quite simply the elimination of the handling of this null condition signal is achieved by operating upon the output signal so that it never will go through zero. Considering the magnitude 2 as illustrated in FIG. 2a to be maximum or full-scale value of the pickoff output signal, applicants provide an A.-C. bias depicted by signal 23 of FIG. 2b having a peak value of at least the full-scale value and preferably full-scale plus many times quadrature value as indicated by the value 2.5 illustrated in the figure.

The bias is provided by means of a bias transformer 26 (FIG. 1) having a primary winding 27 coupled to receive a signal of the same frequency and substantially in-phase with the signal provided by source 15. To this end, the transformer primary conveniently is connected to pickoff excitation source. The transformer 26 has a secondary winding 28 which is coupled between ground (one side of source 15) and one end of the sensing winding 17 of the pickoff. Accordingly an A.-C. bias is superimposed upon the pickoff output which is, then, as depicted in FIG. 2c. The null now at point 30 and maximum negative full-scale value never reaches zero as indicated at 31 of FIG. 2c.

The biased pickoff signal or, more particularly, the combination of bias and pickoff signal is fed to a positive demodulator in a form of a single diode 32 poled as indicated in FIG. 1. The rectified pickoff signal is then fed to a filter 33 including a series resistor 34 and a pair of parallel capacitors 35, 36 connected to the respective ends of the resistor to ground. Similarly, the bias signal from secondary 28 is fed to a half-wave demodulator in the form of a single diode 37 and thence to a filter 38 which is substantially similar to the filter 33. It will be noted, however, that the diodes 32 and 37 are oppositely poled relative to one another so that the rectified bias signal may be conveniently removed by circuitry to be described subsequently.

Thus the output of filter 33 will be substantially as depicted by the envelope 44 of the waveform shown in FIG. 2c. So, too, the output of filter 38 will be substantial as depicted by the envelope 45 of the bias curve 23 of FIG. 2b.

The uni-polar output of filter 33 is then fed to a suitable signal shaping network 50 which, in the illustrated embodiment, is comprised of a resistor 51 in parallel with a pair of resistors 52, 53 having the junction thereof connected to ground by means of a capacitor 54. This particular shaping network will introduce a desired lag in the control system. It may be noted that the system itself, as illustrated herein, will not introduce any additional errors due to long-term variations of the A.-C. supply source 15 since any errors introduced into the sensing coil 17 will also appear at the output of filter 38 and, as will be more particularly described hereafter, these D.-C. components are subtracted. Nevertheless short-term transients in the power supply, A.-C. source 15, will not be perfectly cancelled by the algebraic combination of the outputs of the two filters due to the fact that the output of filter 33 is varied by the shaping network 50. If perfect compensation for transients of the exciting source 15 is required, a second shaping network 55, indicated by dotted box 55, will be provided. Preferably network 55 is identical with the shaping network 50.

The output of shaping network 50 is summed with the output of filter 38 (or with the output of second shaping network 55 where the latter is employed) by means of a summing network comprising resistors 56 and 57. The latter is made variable in order to provide an adjustment which will compensate for a non-zero in-phase component of the sensing coil output at the null position of the sensing instrument. The remaining quadrature component at null position may be compensated for by a phase shifting at the bias signal as will be described hereinafter.

Since diode 32 rectifies signals of one polarity and diode 37 rectifies signals of a second polarity, the addition of the two rectified, filtered, and shaped signals by means of the simple summing network 56, 57 will result in the differential combination of the two at summing point 58. In effect the summing network 56, 57, adds the negative signal depicted by the envelope 45 (FIG. 2b) of the half-wave rectified bias signal together with the signal depicted by the envelope 44 as provided by the filtered and half-wave rectified pickoff output. This effectively eliminates the D.-C. bias component from the pickoff signal. Note that it is possible to use a half-wave demodulator since the bias is chosen to be of a magnitude such that the pickoff signal will never change polarity. It may also be noted that the bias signal may have a phase relation of substantially either zero or 180 degrees with respect to the signal from source 15.

In order to provide for the A.-C. amplification of the signal there is employed a modulator 60 comprising a transistor 61 having its collector connected to the summing point 58 and grounded emitter together with a Zener diode as double-based diode 62 connected between the base and emitter of the transistor. The modulator is, in effect, simply a switch which is turned on and off at the frequency of the signal from source 15 and exactly in-phase therewith by means of the illustrated connections between the source 15 and the transistor base and emitter. Accordingly, the signal at point 58 is a series of pulses having a repetition rate which is the same as that of the A.-C. source and having a polarity in accordance with the sense of the relative motion of the pickoff parts. The D.-C. component of these pulses is removed by means of a coupling capacitor 63 which feeds the combined signal to an A.-C. amplifier 64 from whence it may be fed to suitable control mechanism as may be deemed necessary for a particular application.

Characteristically the output of an inductive pickoff is at some phase angle with respect to the phase of the exciting source. Accordingly, a suitable phase shift network such as that comprised of variable resistor 66 together with a capacitor 67 is employed in connection with the exciting winding in order to bring the sensing signal output exactly into phase with the reference. With such a phase shift, in the absence of bias provided by this invention, the output of the sensing coil will be as indicated by the vector diagram of FIG. 6 wherein vectors 90 and 91 represent maximum ideal or optimum sensing coil outputs of 180 degree and 0 degree phase respectively relative to the reference 92 provided by the phase of the exciting source. However, the nature of pickoff is such that the actual output is as indicated at 93 for 180 degree maximum signal and as indicated at 94 for a 0 degree maximum signal. At null position, when a zero magnitude output is desired, there remains the quadrature component indicated by the vector 95. It is this quadrature component at null position which gives rise to many of the difficulties avoided by application of the principles of this invention. It is to be understood that the angles and null voltage magnitudes illustrated in FIG. 6 are greatly exaggerated for purposes of illustration.

As illustrated in FIG. 7, the present invention provides a bias signal, indicated by the vector 96, which combines with the illustrated maximum in-phase or out-of-phase outputs of the pickoff, indicated at 94 and 93 respectively, to provide resultant maximum in-phase and out-of-phase outputs represented by vectors 97 and 98 respectively. It will be noted that the bias signal 96 of FIG. 7 actually has a quadrature component (relative to the reference phase 92) which is made just equal and opposite to the quadrature vector 95 which exists at null position. In an optimum arrangement, this additional quadrature component of the bias signal will provide a precise in-phase relationship between the output 97 or 98 and the reference 92.

Desired tuning of the bias voltage to provide an optimum quadrature component thereof may be provided by a suitable phase shifting network such as that illustrated by capacitor 69 and variable resistor 68 connected with the primary of the bias transformers 26 in the manner illustrated in FIG. 1.

Even in the absence of a phase shift network such as 68, 69, a substantial improvement still is achieved since, as will be noted, the quadrature voltage 95 and the bias voltage 96 add vectorially. Accordingly, with a typical quadrature voltage on the order of .03 volt and a bias signal which may be on the order of 5 volts the vector sum is negligibly different from the value of the bias signal alone.

While an existing A.-C. pickoff may be most conveniently employed with a demodulator built according to the principles of this invention by adding the bias transformer 26 and the illustrated connections thereof, it will be readily appreciated that an offset or an appropriate bias may be initially built into the sensing instrument itself. Thus, as illustrated in FIG. 3, an instrument pickoff, otherwise identical to that illustrated in FIG. 1, has parts 11 and 12, but is provided with an added bias winding 18 wound upon the same leg as is the sensing winding 17. The bias winding 18 is coupled with the same A.-C. source 15 as is the exciting windings 13, 14. In this arrangement, the bias transformer is eliminated and replaced by a simple resistor 70 which is coupled across the A.-C. source to provide a bias signal to be rectified by the negative demodulator 37. The connection of the sensing winding to the positive demodulator 32 is substantially the same as that previously illustrated with one end of the sensing winding being directly grounded instead of being grounded through the bias transformer secondary as previously illustrated. It will be readily understood that the bias signal added to the signal in the sensing winding 17 by bias coil 18 is arranged to be of the same magnitude as the bias signal fed via resistor 70 to the rectifier 37. Of course small changes in the relative magnitudes may be effected by variation of the summing resistor 57 illustrated in FIG. 1 or by variation of resistor 70.

Illustrated in FIG. 4 is an application of the principles of this invention to a slightly different type of pickoff which includes an exciting winding 71 energized by A.-C. source 15 and a sensing winding 72 which has induced therein an amplitude modulated signal at the frequency of the source 15. The coupling of the sensing winding 72 to the exciting winding 71 is controlled by the motion of an armature 73 which is mounted for pivotal motion about an axis 74 in accordance with the condition to be sensed. Accordingly, the amplitude envelope of the signal induced in sensing winding 72 has a magnitude substantially proportional to the magnitude of relative rotation of armature 73 and a phase relative to the phase of source 15 which is in accordance with the direction of armature rotation. In this arrangement the bias is introduced by means of a pair of resistors 75 and 76 of which that illustrated at 76 is made adjustable in order to control the magnitude of the bias added to the sensing coil 72. Resistor 75 and resistor 76 comprise a voltage divider across the output of the exciting source 15 to provide at point 77 the desired bias voltage which is added to the signal in sensing winding 72 and is also fed to the negative half-wave rectifier 37. As previously described, the combined bias and amplitude modulated signals obtained at the output of the sensing coil 72 is fed to the positive half-wave rectifier 32.

While there have been described embodiments employing inductive-type pickoffs, it will be readily appreciated that the principles of the present invention can be equally well applied to sensing instruments embodying resistive or capacitative pickoffs. As previously indicated, in its broad aspect the concepts of the present invention may be employed with an amplitude modulated signal derived from almost any source without necessarily being limited to such a signal as derived from a pickoff of a sensing instrument.

FIG. 5 illustrates an arrangement employing a resistive potentiometer-type pickoff comprising a center-tap grounded resistor 80 having a moveable wiper arm 81 and energized from the A.-C. source 15. The bi-polar amplitude modulated output at the wiper arm 81 is made uni-polar by the addition thereto of at least full-scale bias signal. The bias signal, as described in connection with FIG. 4 is derived from the A.-C. source 15 by means of a voltage divider comprising resistors 85 and 86 of which one or both is variable, having their junction point 87 coupled to the wiper 81 which itself is coupled to the rectifier 32. The junction point 87 is also coupled to the rectifier 37 which demodulates the bias signal as previously described.

As described in connection with FIG. 1, we may employ suitable phase shifting (not shown) of the bias signal provided in the embodiments of FIG. 3, FIG. 4, and FIG. 5 if deemed necessary or desirable.

It will be seen that there have been described several different embodiments of a demodulator which substantially eases the requirements for a precision zero or null input signal thereto. Since the precision required of the sensing instrument null has been substantially eased, an instrument of less complexity and less precision of manufacture may be adequately employed without loss of sensitivity or other disadvantage. Concomitantly the demodulator itself may employ fewer parts requiring, in certain cases, as little as a single pair of diodes and resistors.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Apparatus for shaping an amplitude modulated alternating current input signal comprising means for generating an alternating current bias signal, means for combining said bias signal with said input signal, a first half-wave rectifier responsively connected to said combining means, a first filter responsively connected to said rectifier, a shaping network responsively connected to said filter, a second half-wave rectifier responsively connected to said bias signal generating means and oppositely poled relative to said first rectifier, a second filter responsively connected to said second rectifier, a first resistor connected at one end thereof to said shaping network, a second resistor connected at one end thereof to said second filter and connected at its other end to the other end of said first resistor, and a modulator connected to the connection between said resistors.

2. The apparatus of claim 1 wherein there is interposed between said second filter and said second resistor a second shaping network.

3. A condition sensing system comprising a sensing device having an exciting element and a sensing element coupled therewith in accordance with a condition to be sensed, a source of alternating current signal coupled with said exciting element, means responsive to said source for providing to said sensing element a bias signal having a magnitude not less than the full scale magnitude of the output of said device, a first demodulator responsive to the output of said biased sensing element, a second demodulator responsive to said bias signal, a shaping network responsive to said first demodulator, a summing device responsive to said second demodulator and to said network, and a modulator responsive to said summing device and phase referenced from said source.

4. The system of claim 3 wherein said means for providing a bias signal includes a phase shift network for shifting the phase of the bias signal by a selected amount with respect to the phase of the signal from said source.

5. The structure of claim 3 wherein said means responsive to said source comprises a transformer having a primary winding coupled to said alternating current source and a secondary winding coupled to said sensing element.

6. The structure of claim 3 wherein said means responsive to said source comprises a bias winding connected to said alternating current source and inductively coupled with said sensing element.

7. The structure of claim 3 wherein said means responsive to said source comprises a resistive network connected to the alternating current source and connected to said sensing element.

References Cited by the Examiner

UNITED STATES PATENTS

| | | | |
|---|---|---|---|
| 2,726,544 | 12/1955 | Anastasia et al. | 328—1 |
| 2,886,657 | 5/1959 | Hirtreiter | 330—10 |
| 2,978,577 | 4/1961 | Ketchiedge | 328—167 |
| 2,991,358 | 7/1961 | Wilcox | 328—167 |
| 3,024,370 | 3/1962 | Cohen | 328—166 |
| 3,085,166 | 4/1963 | Gogia et al. | 328—166 |
| 3,109,145 | 10/1963 | Morris et al. | 328—1 |

FOREIGN PATENTS 658,167   10/1951   Great Britain.

ARTHUR GAUSS, *Primary Examiner.*

JOHN W. HUCKERT, *Examiner.*